United States Patent Office 3,639,328
Patented Feb. 1, 1972

3,639,328
POLYMERS OF TETRAFLUOROETHYLENE
John Michael Downer, Harpenden, England, assignor to Imperial Chemical Industries Limited, London, England
No Drawing. Filed July 1, 1968, Ser. No. 741,240
Claims priority, application Great Britain, July 5, 1967, 30,990/67
Int. Cl. C08f 3/24, 45/22
U.S. Cl. 260—29.6
3 Claims

ABSTRACT OF THE DISCLOSURE

Tetrafluoroethylene is polymerized in aqueous medium in the presence of an internally unsaturated perfluoroalkene having the formula

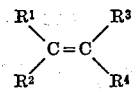

in which $R^1$ and $R^3$ are perfluoroalkyl and $R^2$ and $R^4$ are fluorine or perfluoroalkyl in the presence of a water soluble organic peroxide as initiator and in the presence of a highly fluorinated aliphatic carboxylic or sulfonic acid salt as emulsifier.

---

This invention relates to polymers of tetrafluoroethylene made in aqueous media in the presence of a water soluble organic peroxide as initiator and a highly fluorinated aliphatic carboxylic or sulphonic acid salt (containing 6–12 carbon atoms) as emulsifier, conveniently in the presence of a saturated liquid hydrocarbon containing more than 12 carbon atoms. As described in British specifications 689,400 and 686,438, tetrafluoroethylene polymers made in this way are initially obtained as colloidal aqueous dispersions and they may be concentrated and sold as such or they may be coagulated to give a fine powder useful in paste extrusion when blended with a lubricant.

It has now been found that the properties of such tetrafluoroethylene polymers, particularly when prepared for use in paste extrusion, can be improved by including an internally unsaturated perfluoroalkene as a modifier in the polymerisation mixture. By "an internally unsaturated perfluoroalkene" is meant a compound of the formula

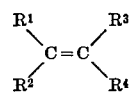

in which $R^1$ and $R^3$ are perfluoroalkyl and $R^2$ and $R^4$ are fluorine or perfluoroalkyl. Examples of such compounds are the trimer (I), tetramer (II) and pentamer (III) of tetrafluoroethylene and the dimers (IV and V) and trimers (VI, VII and VIII) of hexafluoropropene, as described in French specification 1,475,360 (equivalent to British specification 1,082,127) and British specification 910,371. (In the formula, the possibility of geometrical isomerism is disregarded.)

| Compound | Probable structure | | | |
|---|---|---|---|---|
| | $R^1$ | $R^2$ | $R^3$ | $R^4$ |
| I | $C_2F_5$ | $CF_3$ | $CF_3$ | F |
| II | $C_2F_5$ | $CF_3$ | $C_2F_5$ | $CF_3$ |
| III | $(C_2F_5)_2(CF_3)C$ | $CF_3$ | $CF_3$ | F |
| IV | $(CF_3)_2CF$ | F | $CF_3$ | F |
| V | $CF_3$ | | $CF_3$ | $C_2F_5$ | F |
| VI | $(CF_3)_2CF$ | $CF_3$ | $(CF_3)_2CF$ | F |
| VII | $(CF_3)_2CF.CF_2$ | CF | $CF_3$ | $CF_3$ |
| VIII | $CF_3$ | $CF_3$ | $(CF_3)_2CF.CF(CF_3)$ | F |

These internally unsaturated compounds have a highly hindered double bond and are relatively inert chemically, unlike previously proposed modifiers such as methanol or hexafluoropropene. Moreover, they are relatively non-toxic liquids, unlike hexafluoropropene which is a gas and is also toxic, so they are much more convenient to handle in tetrafluoroethylene polymerisations on an industrial scale. The polymers produced, after coagulation and drying, can be fabricated by paste extrusion to give products such as coatings on wire having greatly prolonged coherence under test at 315° C. in comparison with products similarly made from methanol-modified polymers.

The internally unsaturated perfluoroalkenes may be used in conjunction with known modifiers such as hexafluoropropene if desired, when techniques similar to those described in British specification 885,809 may be used.

The following examples illustrate the invention.

EXAMPLE 1

A ten-litre stainless steel autoclave fitted with a stirrer was charged with distilled water (7 dm.³), disuccinic acid peroxide (4.2 g.), tetrafluoroethylene tetramer II (1.75 g.), and eicosane (35 g.), after which the vessel was evacuated to remove oxygen and then pressurised with tetrafluoroethylene gas until the pressure gauge on the autoclave read 0.1 MN/m². The reaction medium was heated with stirring to a temperature of 70° C. and gaseous tetrafluoroethylene was introduced to 2.1 MN/m.² pressure. When the pressure dropped to 1.8 MN/m.², a further quantity of tetrafluoroethylene was introduced until the pressure returned to 2.1 MN/m.². This procedure was repeated throughout the reaction. After the fifth cycle, when about 140 g. of polymer had been formed, a solution of ammonium perfluorooctanoate (1.75 g.) dissolved in distilled water (0.2 dm.³) was injected into the reaction mixture. After a total polymerisation time of 80 minutes an aqueous colloidal dispersion of polytetrafluoroethylene containing 1.05 kg. of the dispersed polymer was obtained. The mean particle size of the dispersed particles was 0.25 µm. No coagulum was formed. When the same amount of tetrafluoroethylene pentamer III was used the yield of polymer was the same after a total polymerisation time of 70 minutes.

These suspensions were coagulated by vigorous stirring and the dried fine powders were mixed with a liquid paraffin lubricant as described in British specification 686,438 and paste-extruded over wire. In tests for coherent electrical insulation after continuous storage at 315° C., wire coated with the polymer made using the tetrafluoroethylene tetramer as modifier retained coherence for 10 days, and wire coated with the polymer made using the pentamer retained coherence for over 20 days, while wire coated with polymer similarly made using methanol as modifier retained coherence for less than one day.

EXAMPLE 2

A ten-litre stainless steel autoclave fitted with a stirrer was charged with distilled water (7 dm.³), disuccinic acid peroxide (1.4 g.), tetrafluoroethylene pentamer III (7 g.), ammonium perfluorooctanoate (0.7 g.) and eicosane (70 g.), after which the vessel was evacuated to remove oxygen and then pressurised with tetrafluoroethylene gas to 0.1 MN/m². The reaction medium was heated to 80° C. and the autoclave was further pressurised with tetrafluoroethylene to 2.1 MN/m.². The pressure was maintained at this level with further additions of tetrafluoroethylene. After a total polymerisation time of 100 minutes an aqueous colloidal dispersion had been formed having a solids content of 17.2%. The mean particle size of the dispersion was 0.15 µm. The polymer was coagulated and used for paste-extrusion as described in Example 1.

EXAMPLE 3

A ten-litre stainless steel autoclave fitted with a stirrer was charged with distilled water (6 dm.$^3$), disuccinic acid peroxide (0.6 g.), tetrafluoroethylene tetramer II (6 g.), ammonium perfluorooctanoate (0.6 g.), and eicosane (60 g.). The procedure of Example 2 was followed except that the polymerisation was carried out at 85° C. and after approximately 420 g. of polymer had been formed 8.4 g. of ammonium perfluorooctanoate was injected in aqueous solution. The polymerisation was continued to give a solids content of 30%. The polymer was coagulated and used for paste-extrusion as described in Example 1.

EXAMPLE 4

The procedure of Example 3 was followed exactly except that at 85° C. the pressure in the reaction vessel was increased first by 0.04 MN/m.$^2$ with hexafluoropropene before being brought to 2.1 MN/m.$^2$ with tetrafluoroethylene, so that the initial gas charge contained about 2 mole percent of hexafluoropropene. The polymerisation was again continued to give a solids content of 30%, and the polymer was coagulated and used for paste-extrusion as described in Example 1.

The amounts of the internally unsaturated perfluoroalkenes used in the method of the invention can be varied within wide limits. Their effects on the properties of the polymers may be observed in some cases at concentrations as low as 0.1 g./dm.$^3$ water, while concentrations as high as 50 g./dm.$^3$ water have little effect on the rate of polymerisation of tetrafluoroethylene.

I claim:

1. A process for preparing dispersion of tetrafluoroethylene polymer in aqueous medium which comprises polymerizing tetrafluoroethylene in said aqueous medium in the presence of (1) a water-soluble organic peroxide as initiator, (2) a member of the group consisting of highly fluorinated aliphatic carboxylic acid salts containing 6 to 12 carbon atoms and highly fluorinated aliphatic sulfonic acid salts containing 6 to 12 carbon atoms as emulsifier and (3) 0.1 g./dm.$^3$ to 50 g./dm.$^3$, based on the weight of the water, of an internally unsaturated perfluoroalkene modifier having the formula $C_nF_{2n}$ wherein $n$ is at least 6 and having the structural formula

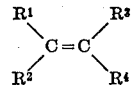

in which $R^1$ and $R^3$ are perfluoroalkyl groups and $R^2$ and $R^4$ are selected from the group consisting of fluorine and perfluoroalkyl groups, the perfluoroalkyl groups containing 1 to 6 carbon atoms.

2. A process as claimed in claim 1 in which said internally unsaturated perfluoroalkene is a member of the group consisting of tetramer and pentamer of tetrafluoroethylene.

3. A process as claimed in claim 1 in which hexafluoropropene as a co-modifier also is present during the polymerization.

References Cited

UNITED STATES PATENTS

| | | | |
|---|---|---|---|
| 2,662,065 | 12/1953 | Berry | 260—92.1 |
| 2,750,350 | 6/1956 | Kroll | 260—92.1 |
| 3,009,892 | 11/1961 | Duddington et al. | 260—92.1 |
| 3,088,941 | 5/1963 | Uhland | 260—92.1 |
| 3,142,665 | 7/1964 | Cardinal et al. | 260—92.1 |

HARRY WONG, JR., Primary Examiner

U.S. Cl. X.R.

117—128.4; 260—33.6, 87.7, 92.1; 264—176